US008919032B1

(12) United States Patent
Paino (10) Patent No.: US 8,919,032 B1
(45) Date of Patent: Dec. 30, 2014

(54) TOP HOOK AND LINE-THROUGH CONFIGURATION FOR SWIM BAITS

(75) Inventor: Matthew Vincent Paino, Temecula, CA (US)

(73) Assignee: Optimum Bait Co., Temecula, CA (US)

(*) Notice: Subject to any disclaimer, the term of this patent is extended or adjusted under 35 U.S.C. 154(b) by 215 days.

(21) Appl. No.: 13/492,248

(22) Filed: Jun. 8, 2012

Related U.S. Application Data (60) Provisional application No. 61/496,499, filed on Jun. 13, 2011.

(51) Int. Cl.
*A01K 85/16* (2006.01)

(52) U.S. Cl.
USPC .......................................... 43/42.1; 43/42.41

(58) Field of Classification Search
CPC ............................... A01K 85/02; A01K 85/16
USPC .............. 43/42.05, 42.1, 42.36, 42.39, 42.08, 43/42.15, 42.24, 42.41
See application file for complete search history.

(56) References Cited

U.S. PATENT DOCUMENTS

| 1,243,391 A * | 10/1917 | Donaly .................... 43/42.36 |
| 6,484,434 B1 * | 11/2002 | Elges ....................... 43/42.47 |
| 8,490,319 B2 * | 7/2013 | Mancini et al. ........... 43/42.09 |
| 2006/0053679 A1 * | 3/2006 | Milanese .................. 43/42.36 |
| 2006/0117642 A1 * | 6/2006 | Huddleston .............. 43/42.24 |
| 2012/0137568 A1 * | 6/2012 | Walsh et al. ............. 43/42.08 |

* cited by examiner

*Primary Examiner* — Peter M Poon
*Assistant Examiner* — Danielle Clerkley
(74) *Attorney, Agent, or Firm* — Richard T. Ogawa; Ogawa P.C.

(57) ABSTRACT

In a specific embodiment, the present invention provides a lure structure for rigging a hook such as a treble hook on an upper portion or top of the swim bait. Many advantages are achieved. For example, the lure is likely to be weedless and prone to fewer snags. That is, the lure has less chance of getting hung up, snagging, or being torn or caught on a bottom structure in the water.

14 Claims, 13 Drawing Sheets

FIGURE 1: SIDE VIEW PHOTOGRAPH

FIGURE 1A: SIDE VIEW PHOTOGRAPH WITH LINE ANGLE

FIGURE 2: BACK VIEW PERSPECTIVE

FIGURE 3: BOTTOM VIEW

FIGURE 4: FACE VIEW

FIGURE 6: SIDE VIEW FLIPPED

FIGURE 7: TAIL VIEW

PADDLE OR BOOT TAIL

FIGURE 8: TOP VIEW

FIGURE 9: SIDE VIEW

FIGURE 10: FRONT VIEW FACE WITH SINKER AND HOOK

FIGURE 11: SIDE VIEW

FIGURE 12: TOP VIEW WITH SINKER AND LINE THROUGH

US 8,919,032 B1

TOP HOOK AND LINE-THROUGH CONFIGURATION FOR SWIM BAITS

CROSS-REFERENCES TO RELATED APPLICATIONS

This application claims priority to U.S. Ser. No. 61/496,499, commonly assigned, and hereby incorporated by reference herein.

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates generally to fishing lures and methods of manufacture. More particularly, the present invention provides a swim bait lure having a top hook and line through configuration. Merely by way of example, top hook and line through configuration can also be used in other applications.

BRIEF SUMMARY OF THE INVENTION

According to the present invention, fishing lures and methods of manufacture are provided. More particularly, the present invention provides a swim bait lure having a top hook and line through configuration.

In a specific embodiment, the present invention provides a lure structure for rigging a hook such as a treble hook on an upper portion or top of the swim bait. Many advantages are achieved. For example, the lure is likely to be weedless and prone to fewer snags. That is, the lure has less chance of getting hung up, snagging, or being torn or caught on a bottom structure in the water.

In a preferred embodiment, the top hook allows for the bait to swim freely over grass, through lily pads, and over tree tops and brush piles, which are commonly known to be natural feeding and hiding areas for bait fish. The top hook also allows fish to strike the bait from above and be hooked from the same. The top hook often has a better hook up ratio and allows for a direct connection to a striking fish to increase the fish landed ratio.

In a specific embodiment, a higher density weight is provided in a lower region which allows for a the retrieved bait to move closer to the bottom for longer periods of time during the retrieve leading to better fishing quality.

In a specific embodiment, the present invention provides for one or more of the following features.
1. In a specific embodiment, the present swim bait structure utilizes the back of the bait (TOP) to secure the hook rather than the more traditional belly set up.
2. The Top Of The Line series utilizes the same highly effective rigging system that allows the hook to release from the body giving angler(s) a direct connection to the fish while at the same time exposing the bait to minimal stress and battle damage.
3. Rigging the treble hook on top allows for many fishing advantages, as the lure is more weedless, than conventional designs. Meaning it has less chance of getting hung up, snagged, torn, or caught on structure in the water.
4. A fisherman can fish it like a jig where they drag it on the bottom without the fear of it getting hung up on something. Also, because of the extra weight from the second tungsten piece they can fish deeper water columns and snap the bait off the bottom with a vertical up and down pop. The top hook does not fall out of the bait while a conventional bottom hooked swim bait falls out when popped or pulled hard. The top hook allows it to swim freely over grass, through lily pads, and over tree tops and brush piles. My findings were unexpected.
5. The top hook allows fish to strike the bait from above. This angle is often touted as have a better hook up ratio.
6. In a specific embodiment, the bait has multiple or two separate weights configured within the body of the lure. A tungsten weight is configured on the belly and is more condensed and heavier allowing the bait as it is retrieved to hover closer to the bottom without coming up as quick. Preferably, the bait is configured to be able to work the bottom of a body of water, which has been proven to lead to better fish quantities. A lead or other weight may be configured near a vicinity of the head of the swim bait.

Various additional objects, features and advantages of the present invention can be more fully appreciated with reference to the detailed description and accompanying drawings that follow.

DETAILED DESCRIPTION OF THE INVENTION

According to the present invention, fishing lures and methods of manufacture are provided. More particularly, the present invention provides a swim bait lure having a top hook and line through configuration.

In a specific embodiment, the present invention provides a substantially snag-proof swim bait device. The device includes a polymeric body region having a collar region, a middle region, and a tail region. The polymeric body region being configured from a volume of plyable polymeric material, e.g., plastisol. The polymeric body region has a top portion and a bottom portion, which is configured as a belly portion of the swim bait. The device has an oversized head configured to the collar region. The oversized head has a width of at least two times greater than a middle width of the middle region. The oversized head has a height of at least two times greater than a middle height of the middle region. The device has a horizontal line region extending from a tip of the oversized head to an end of the tail region. The horizontal line is configured as a centerline from the tip to the end of the tail region. The device has a line through region configured from a vicinity of the tip of the oversized head through a portion of the polymeric body region and exiting near a vicinity of a top portion of the polymeric body region. The line through region is spatially positioned at an angle from about 35 degrees to about 45 degrees relative to the horizontal line region as measured in a counter-clockwise manner as viewed from a left side of the swim bait. The left side of the swim bait is determined when the oversized head faces away from a viewer, while an other side opposing the left side of the swim bait is the right side of the swim bait. The device has a line configured through the line through region and terminating at a hook configured on an outer region of the top portion of the polymeric body region. The line is capable of sliding through the line through once a fish is hooked to allow the hook to spatially separate from the polymeric body configured from the volume of plyable polymeric material. The line is capable of remaining substantially motionless when the hook is partially embedded on the outer region of the top portion of the polymeric body region. The device has a first weight member embedded within the bottom portion. The first weight is insertable into a cavity region of the bottom portion. The device has a second weight member embedded within the oversized head and spatially separate from the first weight member. The second and the first weight members are configured to balance the swim bait device during various retrieve speeds. The hook comprises a first prong embedded on the outer region of the top portion, while exposing a second prong and a third prong configured in a forward direction. Preferably, the hook is a treble hook. The second prong and the third prong have a gap between them. The gap is about the width (or less than the width) of the oversized head such that the width of the oversized head substantially shields the second prong and the third prong from a weed during retrieve of the swim bait. The bottom portion is substantially free from any hook members and is smooth to allow the bait device to be dragged along a bottom region without snagging.

Referring to FIGS. 1 through 12, a soft body swim bait configured for a line-through operation is provided. The bait includes a treble hook D attached to a line A exiting a the bait out of the top portion. The swim bait includes a multi-weight B, C configuration for balance, which facilitates a swimming action at various speeds, e.g., slow, fast, extra-fast. In a specific embodiment, the balance is provided by using a high density weight C with a specific gravity and ratio to relative to a volume of the body (which is generally plastic or plastisol). The weight is generally inserted directly into a bottom or bellow portion of the swim bait at a specific angle. In a specific embodiment, the swim bait includes a tube weight B installed with or without inserts C. In a specific embodiment, the tube weight provided with two inserts to facilitate rigging and swim bait lure movement up the line when a fish is caught. As shown, the present swim bait and related method provides a highly effective rigging technique that allows the hook to be released from the body giving an angle a direct connection to a fighting or striking fish while at the same time exposing the swim bait to reduce or minimal stress and damage while retrieving the hook fish back to the angler. In a preferred embodiment, the tube weight is inserted at a specific angle through a front portion or nose, which allows the swim bait to swim at a natural angle while directing the fishing line to exit the lure out of the top. The angles often desired for weight insertion are determined by specific appendages installed on a master, which is reproduced in a mold for production manufacturing. In a preferred embodiment, the angles are often important and range from about first angle to about second angle from a horizontal position of the swim bait. In a specific embodiment, the angles are often important and are based on size of the swim bait and overall weight. Preferably, the angles vary depending upon those factors but range from about 25 degrees to 70 degrees from a horizontal position of the swim bait. In a specific embodiment, the line angle of the illustrated baits is between 35 and 45 degrees from a horizontal position of the swim bait. The swim bait can be made using either open or closed molds for both flat or rounded (3D) top hook swim bait lures. Of course, there can be other variations, modifications, and alternatives.

In a specific embodiment, the multiple weights are selected for proper balance and retrieval. I discovered that two different density weights are desirable. A first weight made of tungsten and a second weight made of a stainless steel alloy or lead in a specific embodiment. The tungsten is 1.7 times more dense than lead and two times more dense than steel. Lead has a density of 11.3 g/cm3, which is about 40% less dense than tungsten. The density of steel varies and can be about 7.88 g/cm3. In a specific embodiment with tungsten, a density of up to 18.6 g/cm3 can be achieved. Higher density often relates to smaller parts for the same weight.

Figure 1:
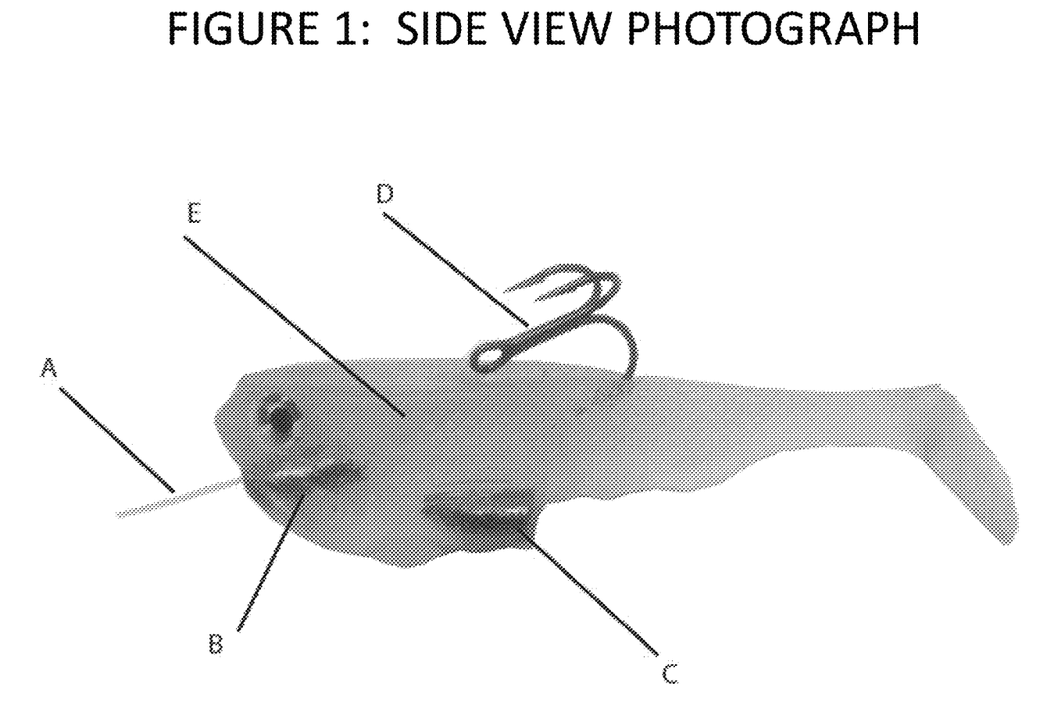
FIG. 1 is a simplified side view diagram of a swim bait according to an embodiment of the present invention.
Figure 1A:
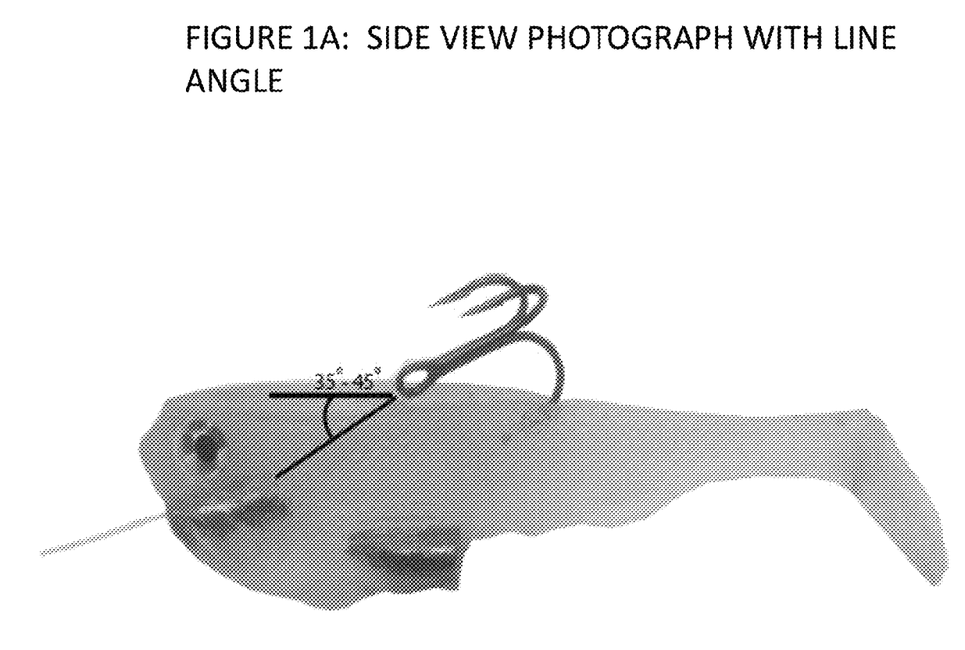
FIG. 1A is a simplified side view diagram of a swim-bait illustrating line angle according to an embodiment of the present invention.
Figure 2:
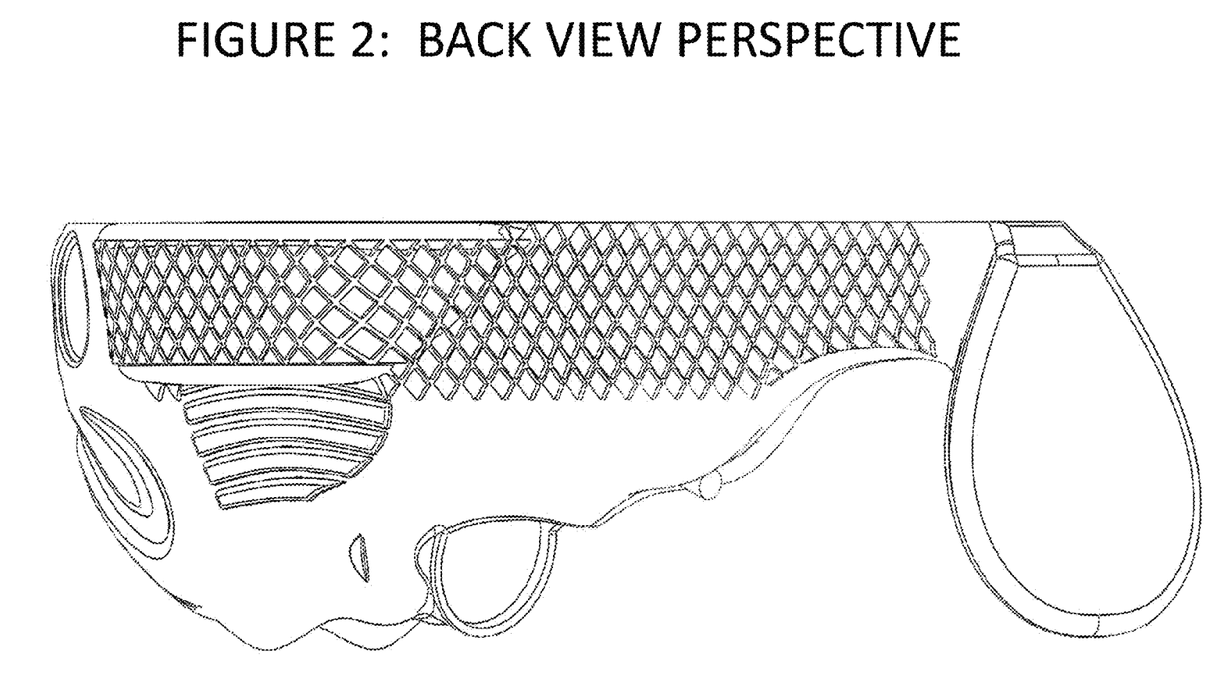
FIGS. 2 through 12 are alternative views of the swim bait device according to FIG. 1.
Figure 3:
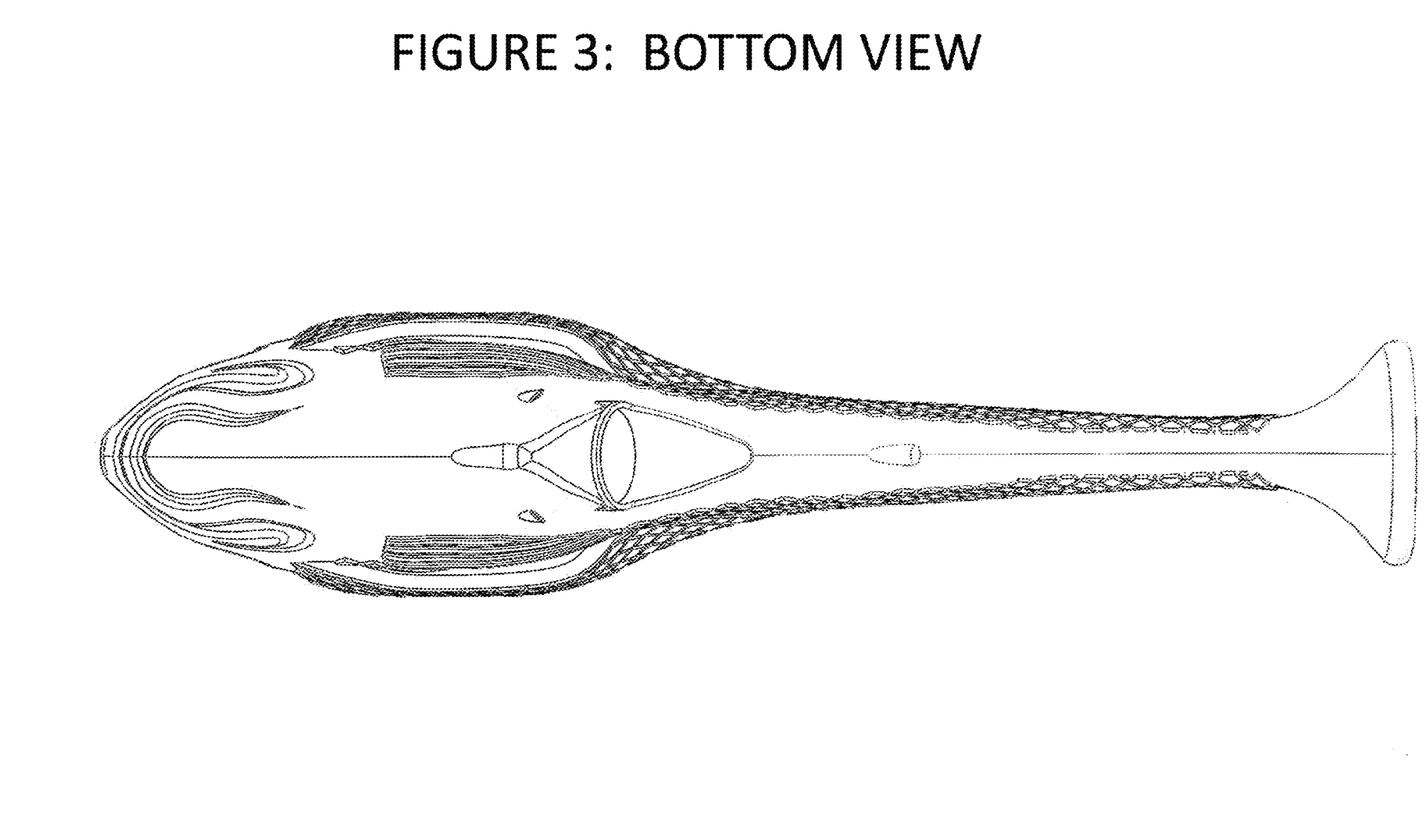
Figure 4:
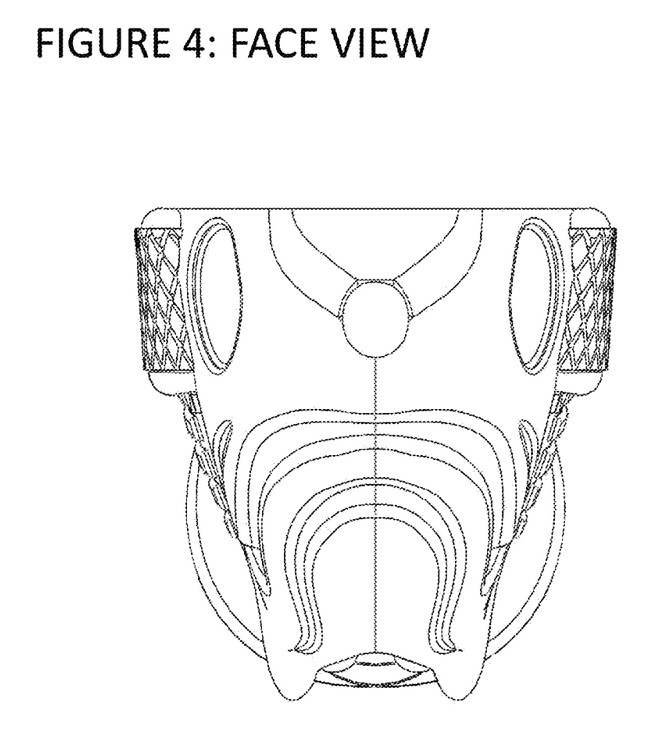
Figure 5:
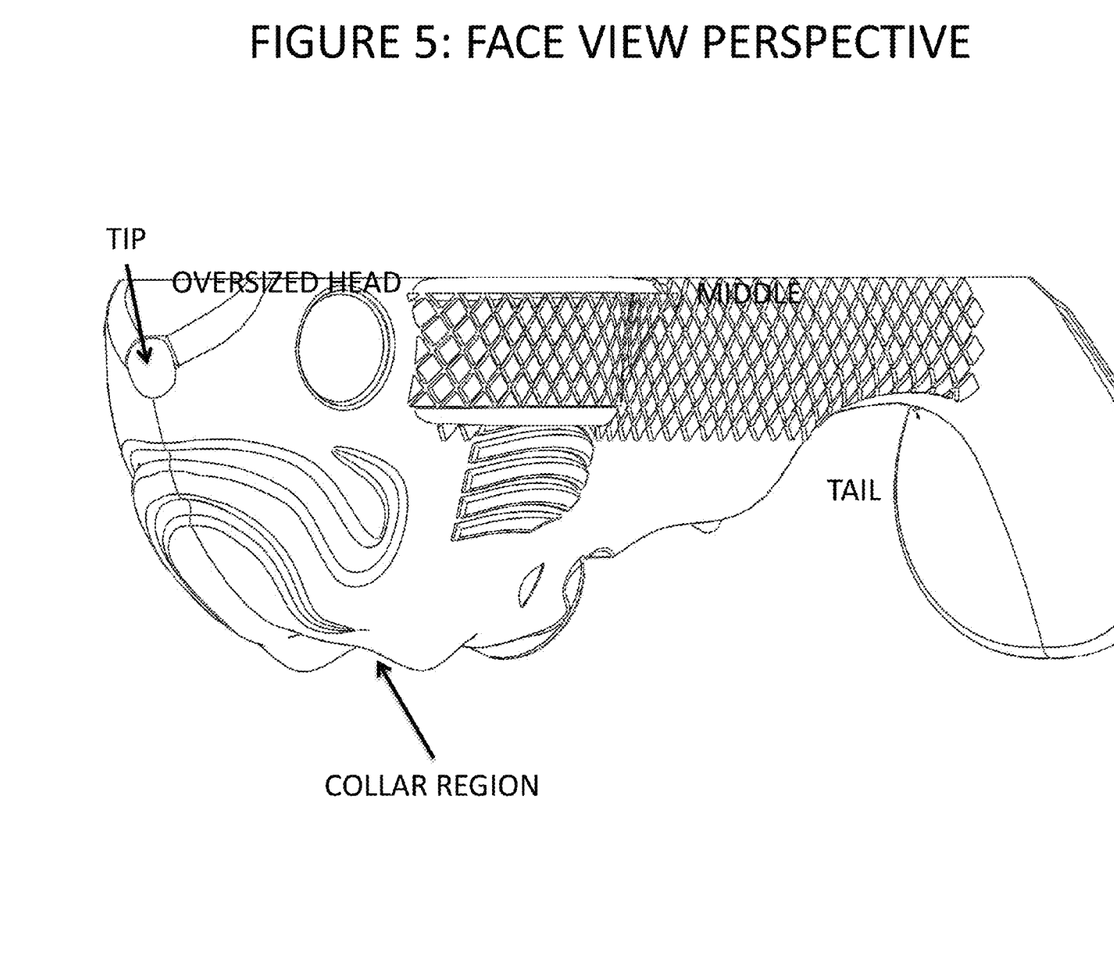
Figure 6:
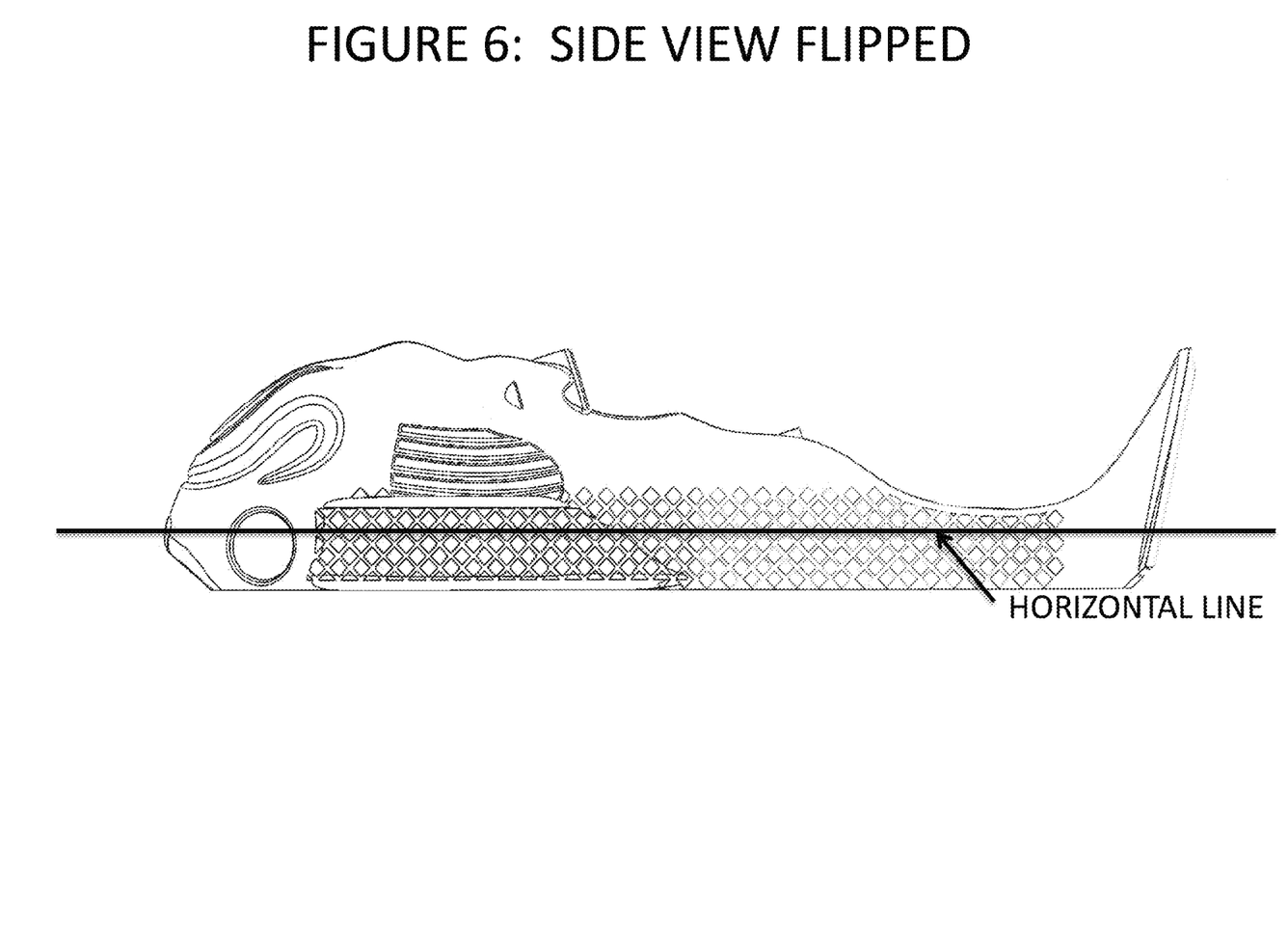
Figure 7:
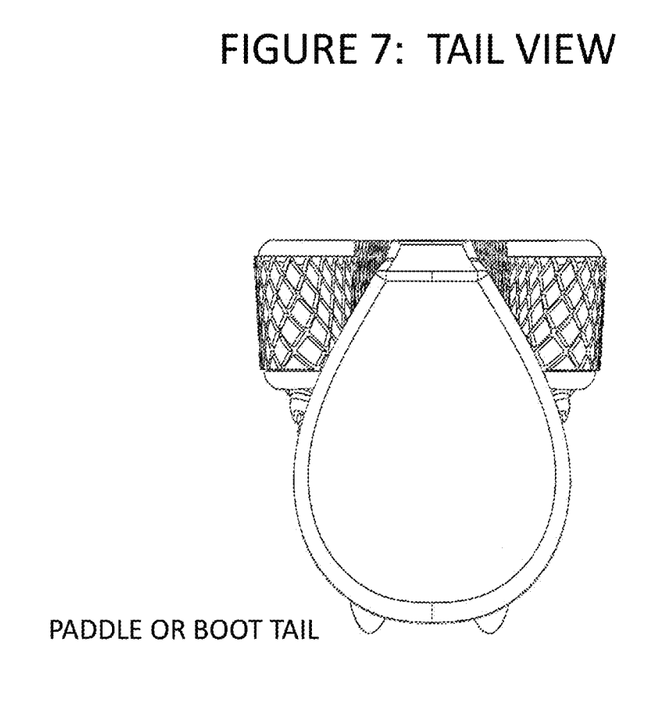
Figure 8:
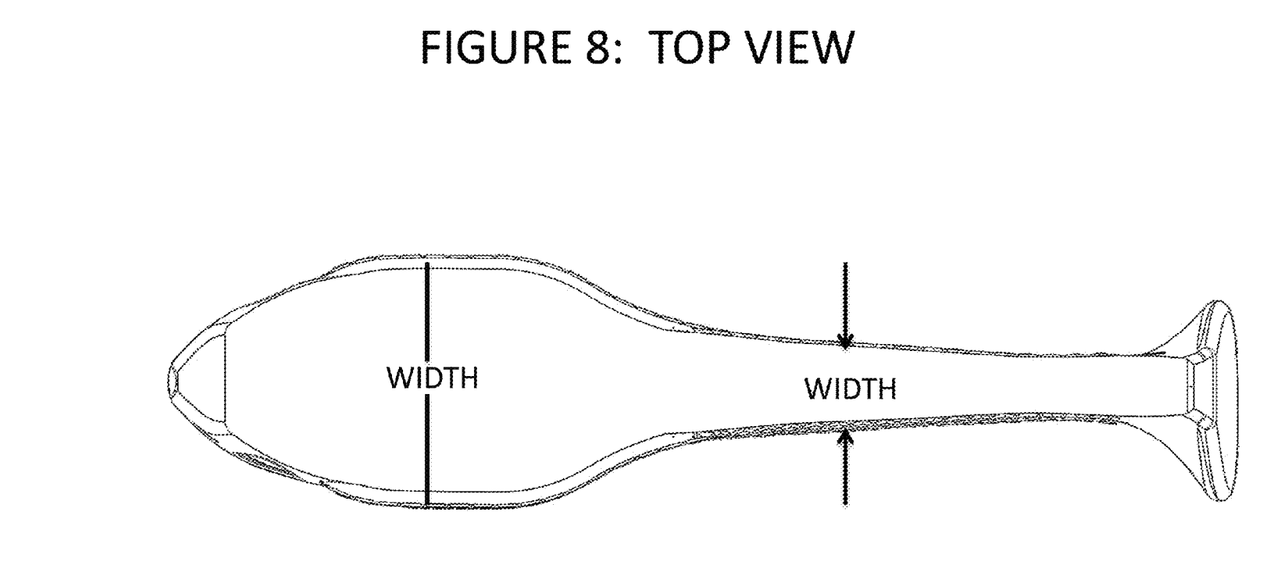
Figure 9:
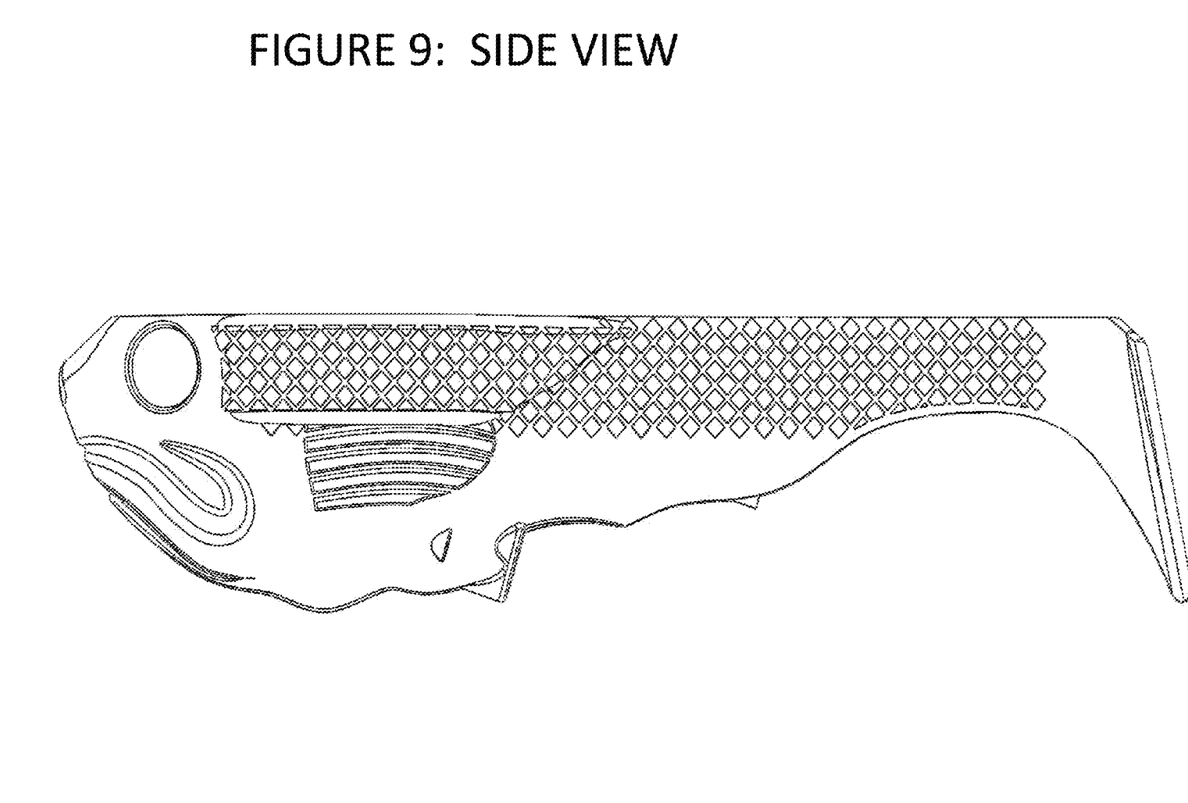

FIG. 2 is a simplified back view perspective diagram of a swim bait device. As shown, the back view illustrates the oversized head, first insertable weight within the cavity of the bottom portion of the swim bait. As shown, the first weight is plugged. FIG. 3 is a bottom view perspective, including the bottom portion and belly. The first weight is also shown. The line through region extends from the top to the upper portion of the device. The oversized head has a length that is slightly shorter than the length of the middle and tail region of the device. Also shown is the width of the oversized head is about two times and greater than the width of the middle and tail regions, although it can be slightly smaller or larger, depending upon the embodiment. FIG. 4 is a front view of the oversized head, including a pair of eyes and tip of the nose. FIG. 5 is a perspective view of the oversized head, including fish face view. FIG. 6 is a side view or right side of the device. FIG. 7 is a back view of tail view of the device. The tail view includes a boot tail or paddle tail or the like. FIG. 8 is a top view of the device without the hook, and FIG. 9 is another side view (which is the left side) of the device.

Figure 10:
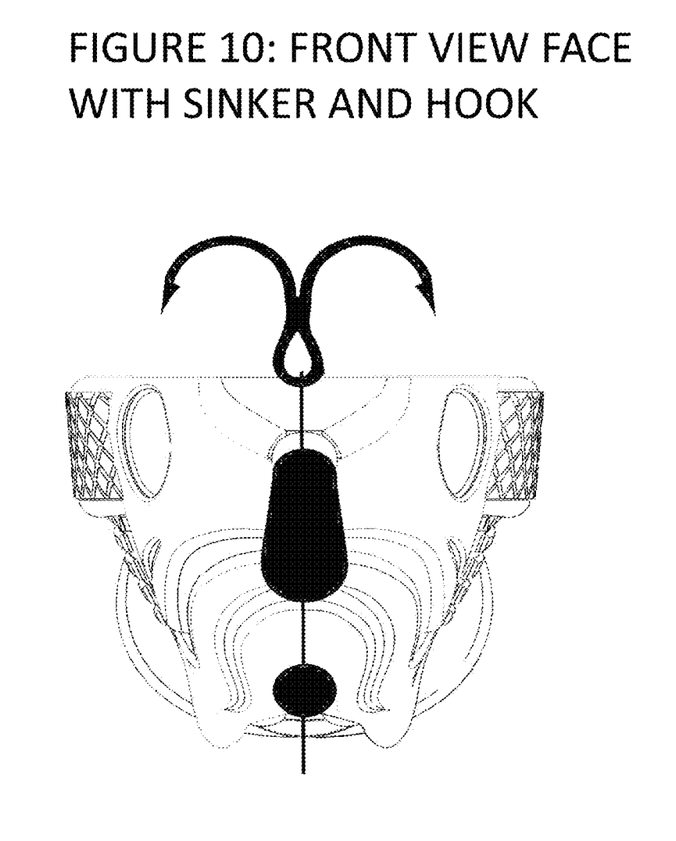
Figure 11:
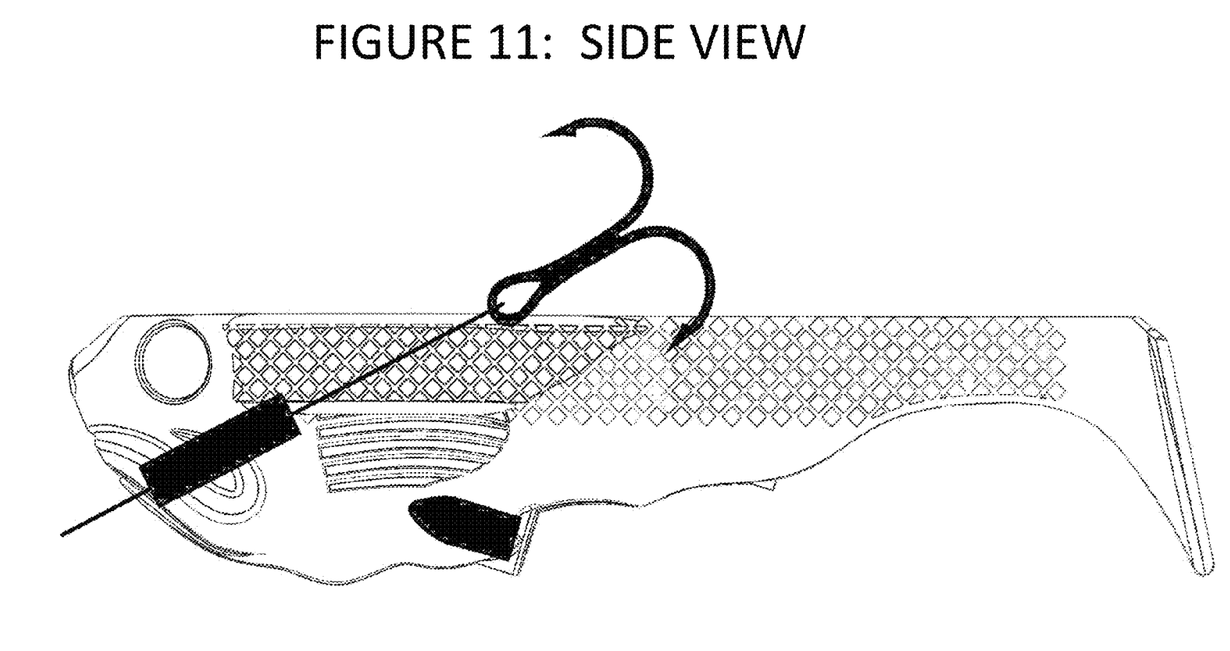
Figure 12:
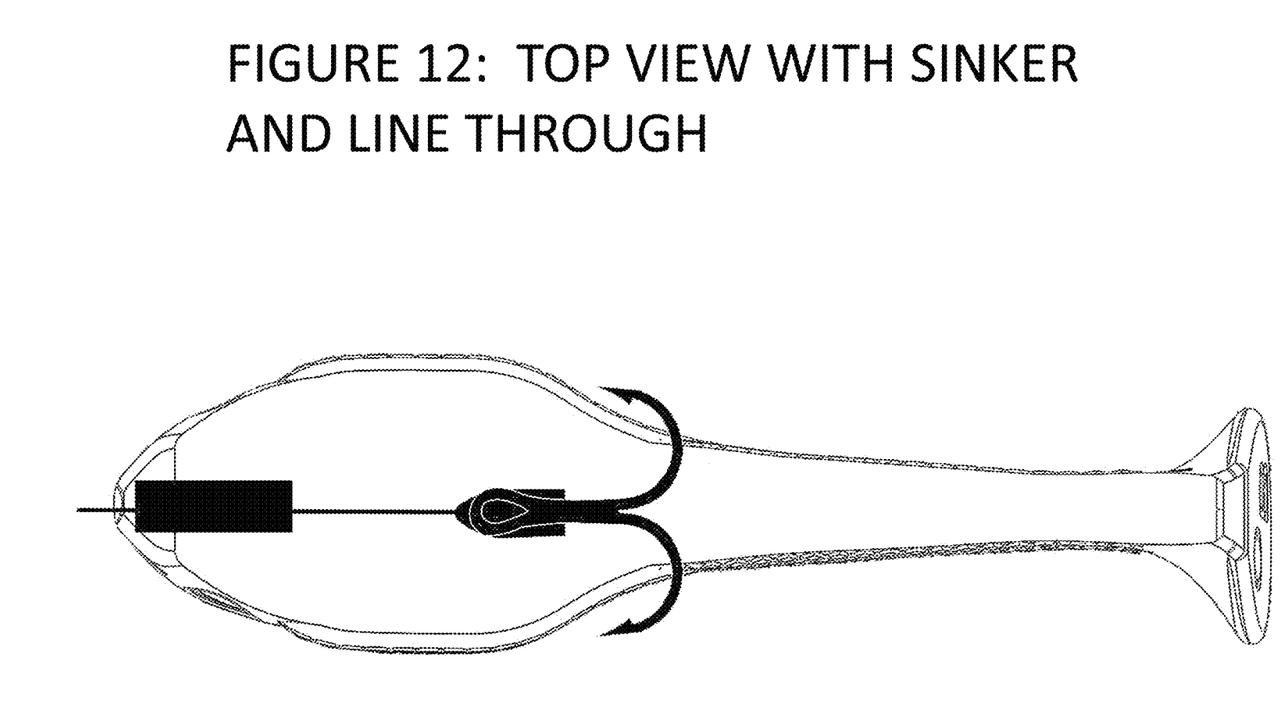

FIG. 10 is a front view of the device including treble hook. As shown, two prongs of the hook include a gap there-between. The gap is smaller in width the a width of the oversized head to facilitate weed-less operation, as will be described below. As also shown is a line through region extending from a region slightly below the nose tip and extending upwardly to exit a back region of the oversized head. As shown is a second weight configured with a through hole, which is concentric with the line through to allow a fishing line to pass-through. FIG. 11 is a side view of the device including the first and second weights, line through, and hook partially embedded into the back region of the oversized head. As shown, a prong of the hook embeds a region in the middle of the device, while the exit of the line through exits near a back portion of the oversized head. The exit of the line is in vertical alignment with the first weight, which is embedded in a belly portion of the device. FIG. 12 illustrates the pair of exposed hooks being shielded by the oversized head to facilitate weed-less operation. That is, the oversized head blocks any weeds or other things that may become entangled with exposed hooks.

Again referring to the Figures, the first weight member has a higher density than a density of the second weight member. The first weight member is comprised of tungsten and the second weight member is comprised of lead or stainless steel in an example. The first weight member is insertable into the portion of the bottom region. The device also has a plug configured to close the cavity region and hold the first weight member in place. In this example, the second weight member is insertable into the portion of the head region; and configured with an opening concentric with the line through region.

The first weight member and the second weight member are configured to balance the swim bait device during various retrieve speeds. The first and second weights are spatially separated from each other by a portion of polymeric material.

The device can also have a rigid tube member configured within the line through region in this example. The ridge tube member is made of a high density plastic or a metal material.

The device has a three prong hook or treble hook. The hook comprises a first prong embedded on the outer region of the top portion, while exposing a second prong and a third prong configured in a forward direction. The second prong and the third prong having a gap between them, the gap being about the width and less of the oversized head such that the width of the oversized head substantially shields the second prong and the third prong from a weed during retrieve of the swim bait. Depending upon the embodiment, the swim bait is selected from a trout lure, a blue gill lure, a shiner lure, or a bass lure. The swim bait is a goby lure.

EXAMPLES

To prove the principle and operation of the present method and device, experiments were performed. As an example, further testing of present lure device and related method have lead to even more support to prove the non-obviousness that the present design is more weedless than the traditional bottom hook design. An "on the water study" was conducted at Lake Fork, Tex. using the present method and lure device. In this example, the Elite Professional angler was not aware that a study was being conducted and fished as he normally fishes for a certain large mouth bass fish. Lake Fork is known for its standing timber and submerged cypress trees. Fish are structure-oriented species and remain at rest next to or within structure. The angler will cast the present lure device as close to and try to brush up against structure as best as possible without getting the lure device snagged. With hooks being exposed on the bottom this is not very feasible and it is often necessary to use an offset style hook and embed the single hook into the body of the lure. During the two days of fishing, the Elite Professional angler made about four hundred (400) casts with the present lure device, whish is being sold as the "Top of the Line Swimbait" by Optimum Bait Co. The angler did not even loose a single (1) lure over the course of the 400 casts with the Top of the Line swim bait. The present lure device and related method achieved a truly unexpected result, which was remarkable in the fishing field. This remarkable result has been contrast with the same or similar style swim bait configured with a bottom hook version often hung up, on the average, every other cast. Fishing in the heavily structured environment is typically non conducive for open hooked swimbaits, however, the present lure device and method had no hang-up or snagging problems using similar fishing tactics. One or more of the following features, which were important for the present swim bait fishing lure device and related methods.

1. A larger size head (relative to the body) of the swim bait coupled with the line angle of the bait as it enters and exits the top of the bait.
2. A larger size head (relative to the body) acts as a brush guard (or bumper) and will cause the bait to deflect the trees and brush from getting stuck in the trees/brush.

In this example, the present experiments have been performed using an 8-14 foot depth range for fishing, predominantly for large mouth bass. The fishing was done in heavily covered water, which is prone to snags, hang-ups, and other undesirable consequences, although a good holding structure for large mouth bass. In this example, the present method of fishing drags the swim bait on the bottom and then allows the swim bait remain at rest for up to 30 seconds at a time on the bottom. This technique is often called "dead sticking," which is not typically done with open hooked swim baits. Because the hook is on the top in combination with the other features, dead sticking is possible. Once the fish were hooked, four (4) out of the seven (7) fish that were caught on the bait jumped on the fight back to the boat. The number of jumping (out of caught fish) is about average. Each of the caught fish remained hooked and was not capable of throwing the swim bait lure because the lure had spatially separated from the hook as it is designed to do so. The fish hooked has no leverage to use the weight of the swim bait at its advantage to free itself from being hooked. The lure device slid away along the line toward the fishing rod and away from the hooked fish using the through hole design.

In the present example, the invention provides a line thru swimbait where the treble hook attached to a line exiting the bait out the top. The bait includes a multi weight configuration strategically placed for balance, which allows for swimming at various speeds. As an example, the bait is configured for balance achieved by utilizing a high density weight with a specific ratio relative to the volume of plastic or polymeric material (e.g., plastisol) and inserted directly into the belly at a specific angle. In this example, a tube weight can be installed with or without inserts but when the tube weight is fitted with 2 inserts it facilitates rigging and lure movement up the line during fish catching, a highly effective rigging system that allows the hook to release from the body giving anglers a direct connection to the fish while at the same time exposing the bait to minimal stress and battle damage. The tube weight is inserted at a specific angle thru the nose, which performs distinct functions: (1) it allows the lure to swim at a natural angle; (2) while directing the fishing line to exit the lure out the top. In this example, the specific angles required for weight insertions are determined by specific appendages installed on the master and reproduced in the production mold. In this example, failure to achieve proper angles results in unnatural swimming actions. These and other features can be utilized on open and closed molds making the present lure and other designs for both flat and rounded (3d) top lures. Of course, there can be other variations, modifications, and alternatives.

In this example, the present lure device and related method may achieve one or more of the following advantages and/or features.

1. Rigging the treble hook on top allows for many fishing advantages, as the lure is now more weed-less, which means it has less chance of getting hung up, snagged, torn, or caught on structure in the water.
2. The top hook allows it to swim freely over grass, through lily-pads, and over tree tops and brush piles, known to be natural feeding and hiding areas of bait fish. The top hook allows fish to strike the bait from above, rather than below. This angle is often touted as have a better hook up ratio. The design also allows for a direct connection to the fish increasing the fish landed ratio.
3. Using a higher density and condensed weight allows a retrieved bait to hover closer to the bottom for longer periods of time during the retrieve leading to better fish quantities.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A substantially snag-proof swim bait device comprising:
   a polymeric body region having a collar region, a middle region, and a tail region, the polymeric body region being configured from a volume of plyable polymeric material, the polymeric body region having a top portion and a bottom portion, the bottom portion being configured as a belly portion of the swim bait;
   an oversized head configured to the collar region, the oversized head having a width of at least two times greater than a middle width of the middle region, the oversized head having a height of at least two times greater than a middle height of the middle region;
   a horizontal line region extending from a tip of the oversized head to an end of the tail region, the horizontal line region being configured as a centerline from the tip to the end of the tail region;
   a line through region configured from a vicinity of the tip of the oversized head through a portion of the polymeric body region and exiting near a vicinity of a top portion of the polymeric body region, the line through region being spatially positioned at an angle from about 35 degrees to about 45 degrees relative to the horizontal line region as measured in a counter-clockwise manner as viewed from a left side of the swim bait, the left side of the swim bait determined when the oversized head faces away from a viewer, while an other side opposing the left side of the swim bait is a right side of the swim bait;
   a line configured through the line through region and terminating at a hook configured on an outer region of the top portion of the polymeric body region, the line being capable of sliding through the line through region once a fish is hooked to allow the hook to spatially separate from the polymeric body region configured from the volume of plyable polymeric material, the line being capable of remaining substantially motionless when the hook is partially embedded on the outer region of the top portion of the polymeric body region;
   a first weight member embedded within the bottom portion, the first weight member being insertable into a cavity region of the bottom portion; and
   a second weight member embedded within the oversized head and spatially separate from the first weight member,
   wherein the hook comprises a first prong embedded on the outer region of the top portion, while exposing a second prong and a third prong configured in a forward direction, the second prong and the third prong having a gap between them, the gap being about the width of the oversized head such that the width of the oversized head substantially shields the second prong and the third prong from a weed during retrieve of the swim bait.

2. The device of claim 1 wherein the first weight member has a higher density than a density of the second weight member; and further comprising a rigid tube member configured within the line through region, the ridge tube member being made of a high density plastic or a metal material.

3. The device of claim 1 wherein the first weight member is comprised of tungsten and the second weight member is comprised of lead or stainless steel.

4. The device of claim 1 wherein the first weight member is insertable into the bottom portion; and further comprising a plug configured to close the cavity region and hold the first weight member in place.

5. The device of claim 1 wherein the second weight member is insertable into the oversized head; and configured with an opening concentric with the line through region.

6. The device of claim 1 wherein the first weight member and the second weight member are configured to balance the swim bait device during various retrieve speeds.

7. The device of claim 1 wherein the polymeric body region comprises plastisol or other plastic material.

8. The device of claim 1 wherein the swim bait is selected from a trout lure, a blue gill lure, a shiner lure, or a bass lure.

9. The device of claim 1 wherein the swim bait is a goby lure.

10. The device of claim 1 wherein the first weight member is physically separated from the second weight member by a portion of the plyable polymeric material.

11. The device of claim 1 wherein the tail region comprises a boot tail or a paddle tail.

12. The device of claim 1, wherein the bottom portion is substantially free from any hook members and is smooth.

13. A substantially snag-proof swim bait device comprising:
   a polymeric body region having a collar region, a middle region, and a tail region, the polymeric body region being configured from a volume of ply-able polymeric material, the polymeric body region having a top portion and a bottom portion, the bottom portion being configured as a belly portion of the swim bait;
   an oversized head configured to the collar region, the oversized head having a width of at least two times greater than a middle width of the middle region, the oversized head having a height of at least two times greater than a middle height of the middle region;
   a horizontal line region extending from a tip of the oversized head to an end of the tail region, the horizontal line region being configured as a centerline from the tip to the end of the tail region;
   a line through region configured from a vicinity of the tip of the oversized head through a portion of the polymeric body region and exiting near a vicinity of a top portion of the polymeric body region, the line through region being spatially positioned at an angle from about 35 degrees to about 45 degrees relative to the horizontal line region as measured in a counter-clockwise manner as viewed from a left side of the swim bait, the left side of the swim bait determined when the oversized head faces away from a viewer, while an other side opposing the left side of the swim bait is a right side of the swim bait;
   a line configured through the line through region and terminating at a hook configured on an outer region of the top portion of the polymeric body region, the line being capable of sliding through the line through region once a fish is hooked to allow the hook to spatially separate from the polymeric body region configured from the volume of plyable polymeric material, the line being capable of remaining substantially motionless when the hook is partially embedded on the outer region of the top portion of the polymeric body region;
   a first weight member embedded within the bottom portion, the first weight member being insertable into a cavity region of the bottom portion; and
   a second weight member embedded within the oversized head and spatially separate from the first weight member, the second weight member and the first weight member being configured to balance the swim bait device during various retrieve speeds,
   wherein the hook comprises a first prong embedded on the outer region of the top portion, while exposing a second prong and a third prong configured in a forward direction, the second prong and the third prong having a gap between them, the gap being less than the width of the oversized head such that the width of the oversized head substantially shields the second prong and the third prong from a weed during retrieve of the swim bait; and wherein the bottom portion is substantially free from any hook members and is smooth to allow the bait device to be dragged along a bottom region without snagging.

14. A method for fishing a bait and popping the bait from a bottom region, the method comprising:

providing a substantially snag-proof swim bait device comprising:

a polymeric body region having a collar region, a middle region, and a tail region, the polymeric body region being configured from a volume of ply-able polymeric material, the polymeric body region having a top portion and a bottom portion, the bottom portion being configured as a belly portion of the swim bait;

an oversized head configured to the collar region, the oversized head having a width of at least two times greater than a middle width of the middle region, the oversized head having a height of at least two times greater than a middle height of the middle region;

a line through region configured from a vicinity of the tip of the oversized head through a portion of the polymeric body region and exiting near a vicinity of a top portion of the polymeric body region, the line through region being spatially positioned at an angle from about 25 degrees to about 70 degrees relative to a horizontal line region as measured in a counter-clockwise manner as viewed from a left side of the swim bait, the left side of the swim bait determined when the oversized head faces away from a viewer, while an other side opposing the left side of the swim bait is a right side of the swim bait;

a line configured through the line through region and terminating at a hook configured on an outer region of the top portion of the polymeric body region, the line being capable of sliding through the line through region once a fish is hooked to allow the hook to spatially separate from the polymeric body region configured from the volume of plyable polymeric material, the line being capable of remaining substantially motionless when the hook is partially embedded on the outer region of the top portion of the polymeric body region;

a first weight member embedded within the bottom portion, the first weight member being insertable into a cavity region of the bottom portion; and a second weight member embedded within the oversized head and spatially separate from the first weight member, the second weight member and the first weight member being configured to balance the swim bait device during various retrieve speeds, wherein the hook comprises a first prong embedded in the outer region of the top portion, while exposing a second prong and a third prong configured in a forward direction, the second prong and the third prong having a gap between them, the gap being less than the width of the oversized head such that the width of the oversized head substantially shields the second prong and the third prong from a weed during retrieve of the swim bait; and wherein the bottom portion is substantially free from any hook members and is smooth to allow the bait device to be dragged along a bottom region without snagging; and allowing the device to sit on a bottom region of a body of water; and popping the device off the bottom region while maintaining the first prong embedded in the outer region of the top portion.

\* \* \* \* \*